Nov. 1, 1955 F. P. DUNIGAN 2,722,648
ALTERNATING CURRENT LOAD CONTROL SYSTEM
Filed March 2, 1953 2 Sheets-Sheet 1

INVENTOR.
FRANCIS P. DUNIGAN
BY Norman S. Blodgett
ATTORNEY

Nov. 1, 1955  F. P. DUNIGAN  2,722,648
ALTERNATING CURRENT LOAD CONTROL SYSTEM
Filed March 2, 1953  2 Sheets-Sheet 2

INVENTOR.
FRANCIS P. DUNIGAN
BY
ATTORNEY

United States Patent Office 2,722,648
Patented Nov. 1, 1955

2,722,648

ALTERNATING CURRENT LOAD CONTROL SYSTEM

Francis P. Dunigan, Holden, Mass., assignor to Machinery Electrification, Inc., Worcester, Mass., a corporation of Massachusetts Application March 2, 1953, Serial No. 339,649

5 Claims. (Cl. 318—476)

This invention relates generally to load control and more particularly to apparatus for obtaining and using the real component of current in a power system.

As is well-known, the load current existing in the line of a 3-phase motor is made up of two components. One component is the real or "in phase" portion which varies from approximately zero, to a maximum value directly in proportion to the load on the motor. The other component is a fixed amount determined by the motor design and is normally called the reactive or "magnetizing" current. These components add vectorially and the actual current in the motor line, as read by an ammeter, is the vector sum of the two. Inasmuch as the reactive current may be 50% of the full load current at loads less than, say, 60%, the line current of the motor is a very poor indication of the load on the motor. Therefore, any load indicator should be so designed as to nullify the reactive current if it is to be a sensitive indicator of motor load. The prior means of solving the problem of measuring real load has been by the use of a special voltmeter having a contact-making device on its pointer. While this works quite well, the special meter is quite expensive and some additional electronic equipment is necessarily involved because the very delicate contacts used on the meter will not handle motor starter current. The present invention obviates the difficulties encountered in the prior art in a very novel manner.

It is therefore an outstanding object of the present invention to provide a sensitive apparatus for obtaining and using the real component of current in a power system.

Another object of the invention is the provision of an apparatus for measuring the real component of current in a 3-phase power line, which apparatus is simple and inexpensive.

It is a further object of this invention to provide an apparatus for operating a relay in response to the exceeding of predetermined amounts by the real component of current in a power system.

A still further object of the instant invention is the provision of an apparatus for cutting off the transmission of current to a 3-phase motor when the load on the motor either exceeds or drops below a predetermined amount.

Still another object of this invention is the provision of apparatus for obtaining the real component of current passing into a 3-phase motor and using this component to operate a relay for opening the motor feed lines when the load on the motor either exceeds or drops below a predetermined level.

Although the novel features which are believed to be characteristic of this invention will be particularly pointed out in the claims appended hereto, the invention itself, as to its objects and advantages, the mode of its operation and manner of its organization may be better understood by referring to the following description taken in connection with the accompanying drawings forming a part thereof, in which:

In general the invention involves the use of a current transformer in one line of a 3-phase motor to obtain a voltage proportional to current in the line. In addition, a voltage signal is taken from the other two lines feeding the motor; a potentiometer is connected across this voltage source, so that any desired portion thereof may be selected. The voltage developed in the secondary of the current transformer is connected in series with the potential selected from the potentiometer and the total amount of this is rectified in a full-wave rectifier. The voltage output of the rectifier is connected through a series resistor and a potentiometer to a thyratron which is also supplied with a negative bias. Now, the geometry of the system is such that the voltage developed across the two lines feeding the motor is 90 degrees out of phase with the voltage developed in the secondary of the current transformer. These are connected in a subtractive manner in such way that, by adjusting the potentiometer across the line, it is possible to cancel out the reactive component of voltage appearing on the secondary of the current transformer. Thus, the D. C. output voltage of the rectifier is directly in proportion to the load component of the motor line current. So, whenever this signal voltage is higher than the bias voltage on the thyratron, the thyratron fires. The thyratron can also be connected in such a way that the thyratron is firing unless the input voltage is above a given magnitude set by the bias. The apparatus can, therefore, be responsive to either a maximum or a minimum value of load current, depending upon how the thyratron is connected.

Figure 1:
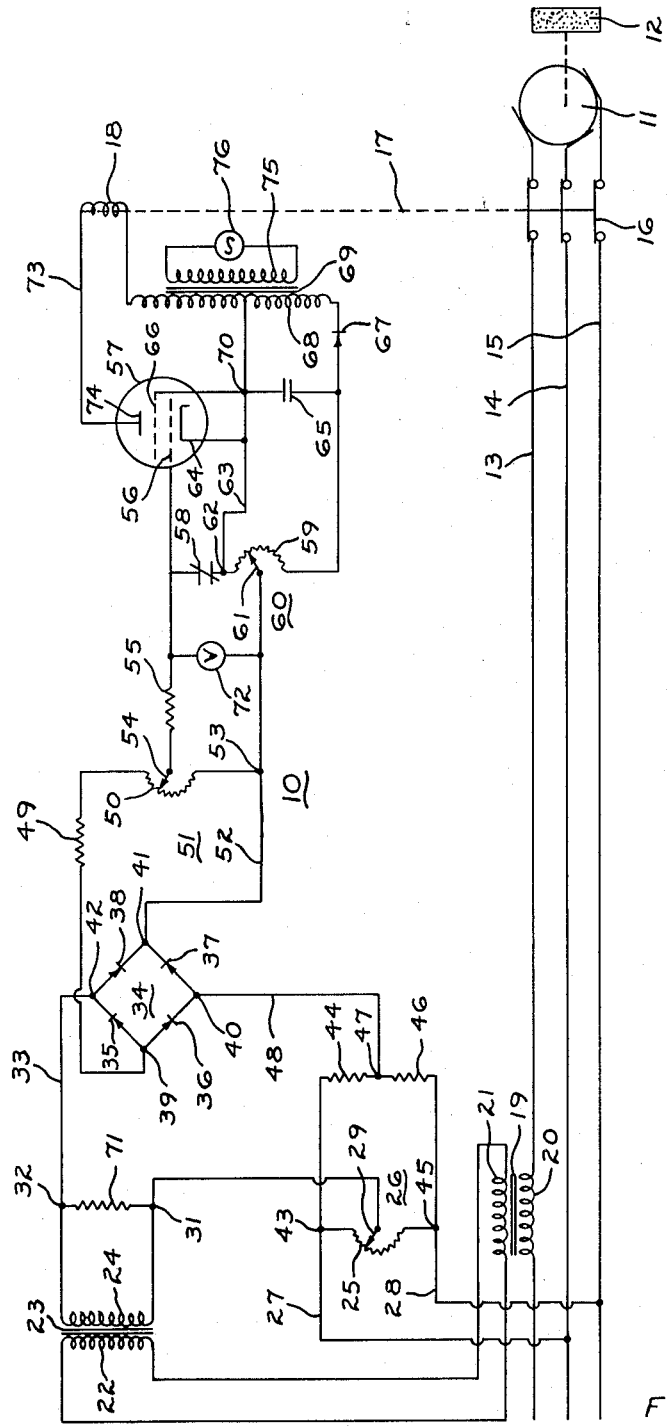
Fig. 1 is a diagrammatic showing of apparatus embodying the features of the present invention.

Referring to Fig. 1, the apparatus of the invention, designated generally by the reference numeral 10, is shown as comprising an electric motor such as a 3-phase induction motor 11 which is connected to drive a load such as a grinding wheel 12. Three-phase electrical power is furnished through the leads 13, 14 and 15. Contacts 16 of a relay 17 are inserted in the leads to interrupt on occasion the current passing therethrough. The relay 17 includes an actuating coil 18 and the relay elements are arranged so that the contacts are normally closed, thus permitting current to flow to the motor, but can be opened by the passage of current through the coil 18. A current transformer 19 is connected with its primary coil 20 inserted in the power lead 13. The secondary coil 21 is connected across the primary coil 22 of a transformer 23, which transformer has a secondary coil 24. A resistor 71 is connected across the coil 24.

The extreme ends of the resistance element 25 of a potentiometer 26 are connected through leads 27 and 28 to the power leads 14 and 15, respectively. The movable contact arm 29 of the potentiometer is connected through a lead 30 to a common junction point 31 of the secondary coil 24 and the resistor 71. The other common point 32 of these two elements is connected through a lead 33 to a rectifying bridge 34. The bridge is made up of four rectifiers 35, 36, 37 and 38; the rectifiers 35 and 36 are connected at point 39, the rectifiers 36 and 37 are connected at point 40, the rectifiers 37 and 38 are connected at the point 41, and the rectifiers 38 and 35 are connected at the point 42. The rectifier 35 is arranged to permit current flow only from point 39 to point 42, rectifier 36 is oriented to permit flow only from point 39 to point 40, the rectifier 37 is connected to permit the passage of current only from the point 40 to the point 41, and the rectifier 38 is arranged to permit current flow only from the point 42 to the point 41. The input of the bridge is across the points 40 and 42, while the output is across the points 39 and 41. The lead 33 is connected to the bridge 34 at the input point 42.

The common junction point 43 of the lead 27 and the resistor element 25 of the potentiometer 26 is connected to one end of a resistor 44; the common point 45 of the lead 28 and the element 25 is connected to one end of a resistor 46. The other ends of the resistors 44 and 46 are connected at the point 47, which point is connected through a lead 48 to the input point 40 of the bridge 34. The output point 39 of the rectifier bridge is connected through a resistor 49 to one end of the resistance element 50 of a potentiometer 51; the output point 41 of the rectifier bridge is connected through a lead 52 to the other end of the resistance element 50, the common junction point being at 53. The movable contact arm 54 is connected through a resistor 55 to the control grid 56 of a thyratron 57. The grid 56 is also connected to one side of a variable capacitor 58 the other side of which is connected to one end of the resistance element 59 of a potentiometer 60, the movable contact arm 61 of which is connected to the point 53. A voltmeter 72 is connected from the arm 61 to the end of the resistor 55 which is away from the arm 54. The common point 62 of the capacitor 58 and the resistance element 59 is connected through a lead 63 to the cathode 64 of the thyratron 57. The other end of the resistance element 59 is connected to one side of a capacitor 65, the other side of which is connected to the cathode 64 and to the screen grid 66 of the thyratron. The former side of the capacitor 65 is also connected through a rectifier 67 to one side of the secondary coil 68 of a transformer 69, the central portion of which is connected to the common junction 70 of the lead 63, the cathode 64, the positive terminal of the battery 65 and the screen grid 66. The other end of the coil 68 is connected to one end of the coil 18 of the relay 17, the other end of which is connected through a lead 73 to the plate 74 of the thyratron. The primary coil 75 of the transformer 69 is connected to a source 76 of alternating current power.

Figure 2:
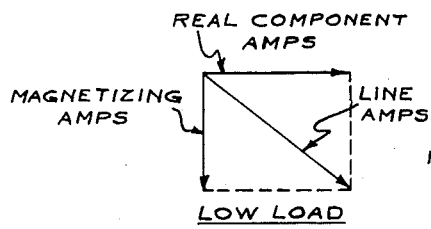
Fig. 2 is a vector diagram of line current components in a power system at low load.
Figure 3:
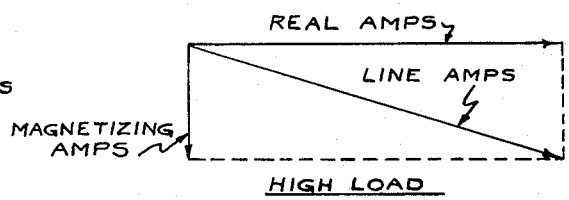
Fig. 3 is a vector diagram of line current components in a power system at high load.
Figure 4:
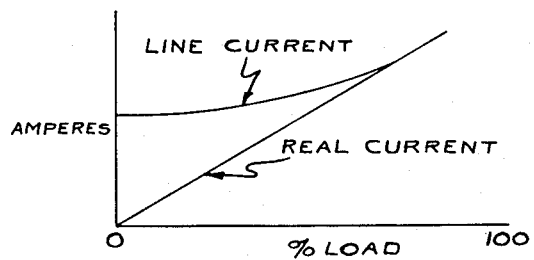
Fig. 4 is a graphical showing of certain relationships inherent in power systems.

An inspection of Figs. 2 and 3, which are vector diagrams of the line current and its components at low and high loads, respectively, shows that, while the magnetizing or reactive component remains substantially the same throughout the range of loads, the real or "in phase" component varies more or less linearly with load. The line current is at all times equal to the vector sum of the real and the reactive components, so that this line current varies somewhat exponentially with load. This relationship is clearly shown in the graph which forms Fig. 4 of the drawings.

Figure 5:
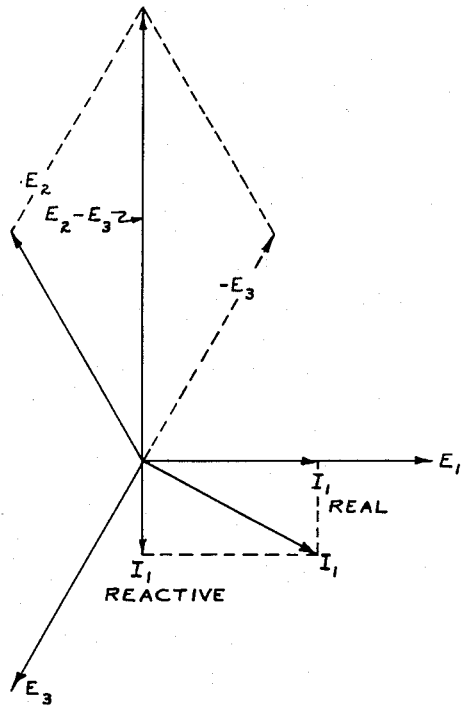
Fig. 5 is a vector diagram showing certain relations between current and voltage in a 3-phase system.

The manner in which the voltage across two 3-phase power lines contains a component in opposition to the reactive component of the current in the third power line is best described in connection with Fig. 5. The vectors E, $E_2$ and $E_3$ represent the peak voltages in the leads 13, 14 and 15, respectively, of the apparatus and, of course, they are shown as spaced 120° from one another to represent their phase relationship. The vector $I_1$ represents the peak value of the current in the lead 13 and it is shown as lagging the voltage because of the impedance of the motor 11. The current $I_1$ has a real component, $I_1$ (real), which is in phase with the voltage on the lead 13 and a reactive component, $I_1$ (reactive), which is at a right angle to the real component. These two components add vectorially to give the actual current $I_1$. Now, the voltage across the leads 14 and 15 can be represented as the vector difference between the voltages on the two leads. In order to subtract vectors graphically, we rotate one of them through 180° and then add them vectorially. The vector labeled $-\dot{E}_3$ represents the first step and the vector $\dot{E}_2-\dot{E}_3$ represents the vector difference or the voltage across the leads 14 and 15. It will be noted, then, that the vector $\dot{E}_2-\dot{E}_3$ has a substantial reactive component and this component is in opposition to the reactive component of the current in the lead 13.

The operation of the invention will now be easily understood in view of the above description. Three-phase power from the usual source is impressed on the leads 13, 14 and 15 and, because the contacts 16 of the relay 17 are in closed position, current flows into the motor 11 causing it to drive the load 12. As the load increases, the current drawn by the motor increases in the manner described above. The load may increase because the grinding wheel 12 is brought into contact with the work, because the feed rate is increased, or because the wheel is becoming "loaded" and uses more energy to overcome friction. In any case, the current passing through the lead 13 will be indicative and usually equal to the current in the other leads. Current passing through the lead 13 must necessarily pass through the primary coil 20 of the transformer 19 and will cause an alternating voltage to appear across the ends of the secondary coil 21, this voltage being proportional to the current in the lead 13. This alternating voltage is impressed on the primary coil 22 of the transformer 23, so that a proportional voltage appears across the secondary coil 24 and across the resistor 71. Now, the connection of the leads 27 and 28 to the power leads 14 and 15, respectively, means that the voltage between the leads 14 and 15 will be impressed across the resistance element 25 of the potentiometer 26. A portion of this voltage is selected by means of the contact arm 29 and impressed across the points 31 and 47. Thus, the voltage appearing across the parts 32 and 47, and ultimately across the input points 42 and 40 of the rectifier bridge 34, is the vector sum of the two voltages originating in the current transformer 19 and across the power leads 14 and 15. According to the theory discussed above in connection with Fig. 5, the voltage appearing across the points 31 and 47 has a component in exact opposition to the reactive component of the voltage appearing across the points 32 and 31. By proper selection of the position of the movable arm 29 of the potentiometer 26 it is possible entirely to neutralize the reactive component of the voltage signal originating in the current transformer. This is done by placing a voltmeter across the points 32 and 47 at no-load and moving the arm 29 until a null reading appears on the voltmeter; then, at loads other than no-load, the signal appearing across these points will be representative of the real component of the current drawn by the motor. It is particularly to be noted that the fact that the signal impressed on the junction 40 of the rectifier bridge 34 is taken from the common junction 47 of the resistors 44 and 46. This means that somewhere in the sweep of the contact arm 29 across the resistance element 25 of the potentiometer 26 at no-load a null will appear on the voltmeter 72. If this arrangement were not used, it would be possible in initially connecting up the apparatus to orient the polarities improperly, so that no null appeared regardless of the adjustment of the potentiometer. While this is of no importance in the laboratory, its presence in practical field use would be very objectionable. Now, the signal across the junctions 40 and 42 is, of course, alternating and, when rectified, appears across the output points 39 and 41 of the rectifying bridge 34. This D. C. signal voltage is impressed across the potentiometer 51. A portion of the signal is selected by means of the contact arm 54 and it is combined in the potentiometer 60 with a bias voltage originating in the transformer 69. If this bias voltage originating in the transformer 69 is of such a polarity as to cause the thyratron 57 to remain in a non-firing state, the combining of this bias with the signal of opposite polarity from the potentiometer 51 will fire the thyratron if the said signal is of greater value than the bias. Firing of the thyratron will cause current to flow in its plate circuit and, thus, through the coil 18 of the relay 17, whereupon the contacts 16 will open. This interrupts the flow of current to the motor 11 and it ceases to provide motive power to the load 12, which is the desired effect.

The apparatus of the invention is very useful in automatically controlling machinery. For instance, a load responsive device such as has been presented above might indicate when drills or other types of tools need sharpening. If the apparatus were connected to the tool drive motor on a machine tool, the load would gradually increase as the tools became dull. Such a control can be used to shut the machine down if the operator attempts to run the machine with a dull tool. Furthermore, in the grinding of metals, as described above in connection with the specific embodiment of the invention, increased load on the grinding wheel drive motor would be indicative of a dull wheel which, in turn, would mean a relatively poor surface quality on the work piece. If the present apparatus were applied to a hammer mill or the like the feed could be stopped until the mill had digested the material already in it.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having thus been described, what is claimed as new and desired to secure by Letters Patent is:

1. Apparatus for limiting the load on a three-phase motor comprising three power leads for passing current to the motor, a relay having contactors interposed in the power leads and an actuating coil for opening or closing the contactors, a current transformer whose primary coil is interposed in one of the power leads whereby the secondary coil of the transformer has a voltage thereacross which is proportional to the current passing through the said one power lead, a potentiometer connected across the other two power leads, the transformer and the potentiometer being connected to the input of a rectifying bridge, a source of reference voltage to which the output of the bridge is connected in order that the output voltage may be added in opposite polarity to the reference voltage, a thyratron connected to the bridge and the source so as to be rendered conductive by a voltage output of the bridge which is outside of the limit determined by the reference voltage, the actuating coil of the relay being connected into the plate circuit of the thyratron for opening the contactors in the power leads when the thyratron is conductive.

2. Apparatus for limiting the load on a three-phase motor comprising power leads connected to the motor for supplying three-phase electrical power thereto, a relay having contactors interposed in the power leads and an actuating coil for opening or closing the contactors, a current transformer having a primary coil which is interposed in one of the power leads whereby the secondary coil of the transformer has a voltage thereacross which is proportional to the current passing through the said one power lead, a potentiometer connected across the other two power leads, two resistors each having an end attached to a respective end of the resistance element of the said potentiometer, a rectifying bridge having input and output junctions, the secondary coil of the current transformer being so connected that a voltage originating therein is impressed across the contacting arm of the potentiometer and an input junction of the rectifying bridge, the said other ends of the two resistors being connected to each other and to another input junction of the rectifying bridge, a source of reference voltage to which the output of the bridge is connected in order that the output voltage may be added in opposite polarity to the reference voltage, a thyratron connected to the bridge and the source so as to be rendered conductive by a voltage output of the bridge which is outside of the limit determined by the reference voltage, the actuating coil of the relay being connected into the plate circuit of the thyratron for opening the contactors in the power leads when the thyratron is conductive.

3. Apparatus for limiting the load on a three-phase motor comprising three power leads for passing current to the motor, a relay having contactors interposed in the power leads and an actuating coil for opening and closing the contactors, a current transformer whose primary coil is interposed in one of the power leads whereby the secondary coil of the transformer has a voltage thereacross which is proportional to the current passing through the said one power lead, a potentiometer connected across the other two power leads, two resistors each having an end attached to a respective end of the resistance element of the said potentiometer, a rectifying bridge having input and output junctions, the transformer being connected to the input of the bridge, the other ends of the two resistors being connected to each other and to the input of the rectifying bridge, a source of reference voltage to which the output of the bridge is connected in order that the output voltage may be added in opposite polarity to the reference voltage, a thyratron connected to the bridge and to the source so as to be rendered conductive by a voltage output of the bridge which is outside of the limit determined by the reference voltage, the actuating coil of the relay being connected into the plate circuit of the thyratron for opening the contactors in the power leads when the thyratron is conductive.

4. Apparatus for limiting the load on a three-phase motor comprising power leads connected to the motor for supplying three-phase electrical power thereto, a relay having contactors interposed in the power leads and on actuating coil for opening and closing the contactors, a current transformer having a primary coil which is interposed in one of the power leads whereby the secondary coil of the transformer has a voltage thereacross which is proportional to the current passing through the said one power lead, a potentiometer connected across the other two power leads, a rectifying bridge having input and output junctions, the secondary coil of the current transformer being so connected that a voltage originating therein is impressed across the contacting arm of the potentiometer and an input junction of the rectifying bridge, a source of reference voltage to which the output of the bridge is connected in order that the output voltage may be added in opposite polarity to the reference voltage, a thyratron connected to the bridge and the source so as to be rendered conductive by a voltage output of the bridge which is outside of the limit determined by the reference voltage, the activating coil of the relay being connected into the plate circuit of the thyratron for opening the contactors in the power leads when the thyratron is conductive.

5. Apparatus for limiting the load on a three-phase motor comprising power leads connected to the motor for supplying three-phase electrical power thereto, a relay having a contactor interposed in each power lead and an actuating coil for opening or closing the contactors, a current transformer having a primary coil which is interposed in one of the power leads whereby the secondary coil of the transformer has a voltage thereacross which is proportional to the current passing through the said one power lead, a potentiometer having a resistance element connected at its ends to the other two power leads, two resistors each having an end attached to a respective end of the resistance element of the said potentiometer, a rectifying bridge formed of a series of rectifiers and having input and output junctions, the secondary coil of the current transformer being connected to the primary coil of a voltage transformer the secondary coil of which is connected across the contacting arm of the potentiometer and an input junction of the rectifying bridge, the said other ends of the two resistors being connected to each other and to another input junction of the rectifying bridge, a source of reference voltage to which the output of the bridge is connected in order that the output voltage of the rectifying bridge may be added in opposite polarity to the reference voltage, a thyratron having its grid connected to the bridge and the reference voltage source so as to be rendered conductive by a voltage output of the bridge which is outside of the limit determined by the reference voltage, the actuating coil of the relay being connected in series with the plate circuit of the thyratron for opening the contactors in the power leads when the thyratron is conductive.

References Cited in the file of this patent

UNITED STATES PATENTS

| | | |
|---|---|---|
| 2,428,723 | Reeves | Oct. 7, 1947 |
| 2,469,706 | Winther | May 10, 1949 |
| 2,498,057 | Winther | Feb. 21, 1950 |
| 2,620,464 | Hunter et al. | Dec. 2, 1952 |